(12) United States Patent
Akagi et al.

(10) Patent No.: US 8,517,050 B2
(45) Date of Patent: Aug. 27, 2013

(54) PRESSURE REGULATING DEVICE

(75) Inventors: Masaki Akagi, Okazaki (JP); Hideaki Nishibu, Tokai (JP)

(73) Assignees: Toyota Jidosha Kabushiki Kaisha, Aichi-ken (JP); Aisan Kogyo Kabushiki Kaisha, Aichi-ken (JP)

( * ) Notice: Subject to any disclaimer, the term of this patent is extended or adjusted under 35 U.S.C. 154(b) by 6 days.

(21) Appl. No.: 13/151,514

(22) Filed: Jun. 2, 2011

(65) Prior Publication Data

US 2011/0297253 A1    Dec. 8, 2011

(30) Foreign Application Priority Data

Jun. 3, 2010   (JP) .................................. 2010-127979

(51) Int. Cl.
*F02D 9/00*   (2006.01)

(52) U.S. Cl.
USPC ............ 137/479; 137/510; 123/511; 123/514

(58) Field of Classification Search
USPC ......... 123/459, 461, 462, 511, 514; 137/479, 137/509, 510, 601.2, 601.14, 601.03, 625.33
See application file for complete search history.

(56) References Cited

U.S. PATENT DOCUMENTS

| | | | | |
|---|---|---|---|---|
| 3,662,721 A * | 5/1972 | Klein | | 123/462 |
| 3,970,063 A * | 7/1976 | Mayr et al. | | 123/455 |
| 7,740,006 B2 * | 6/2010 | Ikeya | | 123/506 |
| 7,878,179 B2 * | 2/2011 | Ikeya | | 123/457 |
| 2011/0297126 A1 * | 12/2011 | Akagi et al. | | 123/457 |

FOREIGN PATENT DOCUMENTS

| JP | 2007-218222 A | 8/2007 |
|---|---|---|
| JP | 2009-108684 A | 5/2009 |
| JP | 2009-144686 A | 7/2009 |

\* cited by examiner

*Primary Examiner* — John Fox
*Assistant Examiner* — R. K. Arundale
(74) *Attorney, Agent, or Firm* — Sughrue Mion, PLLC

(57) ABSTRACT

A pressure regulating device that regulates a pressure of a fuel, including a housing that includes a fuel introduction passage into which the fuel to be supplied into a fuel consuming unit is introduced and a fuel discharge passage from which the fuel is discharged, wherein the fuel discharge passage includes a plurality of discharge passage portions; a pressure regulating provided so as to partition the housing, and that communicates the fuel introduction passage with the fuel discharge passage and cuts off the fuel introduction passage from the fuel discharge passage, according to a pressure of the fuel in the housing; an impelling mechanism that impels the pressure regulating member in a direction of cutting off the fuel introduction passage from the fuel discharge passage; and a discharge restricting mechanism, provided in the fuel discharge passage, that selectively restricts discharge of the fuel from the discharge passage portions.

8 Claims, 8 Drawing Sheets

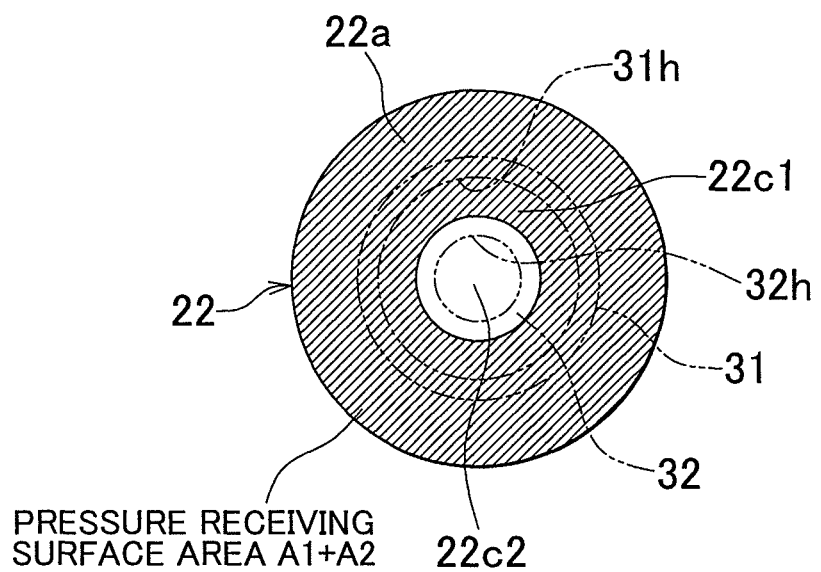

PRESSURE REGULATING DEVICE

INCORPORATION BY REFERENCE

The disclosure of Japanese Patent Application No. 2010-127979 filed on Jun. 3, 2010 including the specification, drawings and abstract is incorporated herein by reference in its entirety.

BACKGROUND OF THE INVENTION

1. Field of the Invention

The invention relates to a pressure regulating device, and more particularly to a pressure regulating device that regulates pressure of fuel supplied to a fuel-consuming unit.

2. Description of the Related Art

In a fuel supply system of an internal combustion engine installed on a vehicle or the like, fuel is generally supplied to fuel injectors from a fuel pump and the pressure of fuel in the fuel supply passage is regulated by a pressure regulator which is a pressure regulating device. The interior of the pressure regulating device housing is compartmentalized by a diaphragm into a pressure regulating chamber and a back pressure chamber. In the pressure regulating device, an impelling force in the valve opening direction that is created by a fuel pressure inside the pressure regulating chamber and an impelling force in the valve closing direction from a back pressure chamber side act upon the diaphragm, and then, part of the fuel inside the pressure regulating chamber is discharged according to the displacement of the diaphragm. Thus, the fuel pressure inside the pressure regulating chamber is regulated to a predetermined set pressure based on the impelling force from the back pressure chamber.

An example of a pressure regulating device of this type is available that includes, first and second diaphragms that compartmentalize the housing interior into three pressure chambers, a valve body that is mounted on the first diaphragm so as to open and close a discharge port for pressure regulation inside the first pressure chamber between the housing and the first diaphragm, a pressure receiving body that is connected to the valve body by a connecting rod, which is disposed in the second pressure chamber between the first and second diaphragms, and is fixedly attached to the second diaphragm, and a spring that is provided in the third pressure chamber between the housing and the second diaphragm and impels the pressure receiving body in the valve opening direction. In such pressure regulating device, the fuel pressure that is to be regulated is switched in a plurality of slevels by controlling the pressure supplied to the second and third pressure chambers (see, for example, Japanese Patent Application Publication No. 2009-108684 (JP-A-2009-108684)).

Further, an another example of the pressure regulating device is available, that includes a spring that imparts a back pressure to biases a back surface portion of a valve member at its distal end side, and a plunger that displaces a proximal end portion of the spring when a back pressure fluid is supplied is that imparts a back pressure and biases a back surface portion of a valve member at a distal end side and that is provided at a proximal end side of the spring. The pressure regulating device is configured to switch a set value of the regulated pressure between a low-pressure value and a high-pressure value by switching a pressing load of the spring (see, for example, Japanese Patent Application Publication No. 2009-144686 (JP-A-2009-144686)).

An another example of the pressure regulating device is also available in which an electromagnetic valve functioning as a cut-off valve is mounted on the return pipe of a back pressure chamber that introduces a back pressure fluid, and when it is determined that fuel vapor may be generated, the pressure on the back pressure chamber side is raised to increase the pressure supplying the fuel to the injector to a level at which the generation of fuel vapor is inhibited. In the pressure regulating device, the idling rotation speed is prevented from becoming unstable as a result of fuel vapor generation when the engine is restarted at a high temperature (see, for example, Japanese Patent Application Publication No. 2007-218222 (JP-A-2007-218222)).

However, in the conventional pressure regulating device in which a plunger or second diaphragm is provided at the back pressure chamber side, the interior of the housing is compartmentalized into the first to third pressure chambers that are mutually adjacent in the diaphragm displacement direction. Therefore, the pressure regulating device is difficult to reduce in size and difficult to install. Another problem is that since fluid inlet and outlet are required for each of the first to third pressure chambers, the piping configuration becomes extremely complex.

Further, in the conventional pressure regulating device in which a fluid pressure is introduced into the back pressure chamber inside the housing, the fluid pressure is necessary even outside the pressure regulating chamber when high-pressure regulation is performed. As a result, the excess fluid is necessary, the number of locations where sealing performance is required is increased, and cost is raised.

Further, in the conventional pressure regulating device in which an electromagnetic valve is mounted on the return pipe for returning excess fuel into the fuel tank after the fuel has passed through the fuel gallery, the fuel passage range in which fuel pressure rises when the engine is started becomes wide. The resultant problem is that sealing capable of withstand a high pressure is required for the entire range of fuel passage and therefore the cost of the pressure regulating device is increased.

SUMMARY OF THE INVENTION

The invention provides a compact low-cost pressure regulating device with a simple pipe configuration that is suitable for set pressure switching.

The first aspect of the invention relates to a pressure regulating device that regulates a pressure of a fuel, including: a housing that includes a fuel introduction passage into which the fuel to be supplied into a fuel consuming unit is introduced and a fuel discharge passage from which the fuel is discharged, wherein the fuel discharge passage includes a plurality of discharge passage portions each configured to pass therethrough the fuel introduced into the fuel introduction passage; a pressure regulating member, provided so as to partition the housing, that communicates the fuel introduction passage and the fuel discharge passage with each other and cuts off the fuel introduction passage and the fuel discharge passage from each other, according to a pressure of the fuel introduced into the housing; an impelling mechanism that impels the pressure regulating member in a direction of cutting off the fuel introduction passage and the fuel discharge passage from each other; and a discharge restricting mechanism, provided in the fuel discharge passage, that selectively restricts discharge of the fuel from the plurality of discharge passage portions.

With such a configuration, when discharge of the fuel from the plurality of discharge passage portions is selectively restricted by the discharge restricting mechanism, the pressure regulating member that receives an impelling force in the all-time cut-off direction (valve closing direction) from the impelling mechanism receives the pressure of fuel introduced into the fuel introduction passage in the communication direction (valve opening direction) and receives the pressure of fuel in any of the discharge passage portions from which the discharge is restricted also in the valve opening direction. As a result, the pressure of fuel in the fuel introduction passage that is regulated by the pressure regulating member is decreased. By contrast, when discharge of the fuel from the plurality of discharge passage portions is not restricted by the discharge restricting mechanism, the pressure regulating member that receives the impelling force in the all-time valve closing direction from the impelling mechanism receives the pressure of fuel introduced in the fuel introduction passage in the valve opening direction, but does not anymore receive the pressure of fuel in any of the discharge passage portions in the valve opening direction. As a result, the pressure of fuel in the fuel introduction passage that is regulated by the pressure regulating member is increased. Thus, set pressure switching can be performed by selectively restricting fuel discharge from the plurality of discharge passage portions with the discharge restricting mechanism. Therefore, the pressure of fuel introduced into the fuel introduction passage can be switched to a high pressure or a low pressure by introducing the fuel only to one surface side of the pressure regulating member, without introducing the fuel to both surface sides thereof, and the number of pipes and seal locations can be reduced. As a result, it is possible to provide a compact and low-cost pressure regulating device with a simple pipe configuration that is suitable for switching a set pressure.

In the pressure regulating device having the above-described configuration, the discharge restricting mechanism may restrict discharge of the fuel from at least one discharge passage portion from among the plurality of discharge passage portions by changing a passage cross sectional area of the at least one discharge passage portion.

With such a configuration, a low-cost discharge restricting mechanism can be easily constituted by a valve or a variable-throttle element that is connected to any (at least one) of the plurality of discharge passage portions.

In the pressure regulating device having the above-described configuration, the discharge restricting mechanism may be constituted by an opening-closing valve disposed in the at least one discharge passage portion. In this case, the low-cost discharge restricting mechanism is obtained.

In the pressure regulating device having the above-described configuration, the discharge restricting mechanism may be constituted by an opening-closing valve disposed in the at least one discharge passage portion and a relief valve provided in parallel with the opening-closing valve. In this case, the pressure of fuel in the discharge passage portion that is subjected to discharge restriction is restrained from becoming excessively high, and the pressure of fuel received by the pressure regulating member in the discharge passage portion that is subjected to discharge restriction can be regulated by the set pressure of the relief valve.

In the pressure regulating device having the above-described configuration, the pressure regulating member may include a first surface that forms, between the housing and the first surface, a pressure regulating chamber communicating with the fuel introduction passage and a second surface that positions at an opposite side to the first surface; the impelling mechanism may impel the second surface in the direction of cutting off the fuel introduction passage and the fuel discharge passage from each other; and the pressure regulating member may shift in the direction of communicating the fuel introduction passage and the fuel discharge passage with each other according to a pressure of the fuel introduced in the pressure regulating chamber.

Further, in the pressure regulating device having the above-described configuration, the pressure regulating member may be constituted by an annular membrane member and a plate member positioned on the inner circumference of the annular membrane member; and the impelling mechanism may impel the plate member in the direction of cutting off the fuel introduction passage and the fuel discharge passage from each other. Furthermore, the fuel introduction passage and the plurality of discharge passage portions may be compartmentalized by a plurality of annular valve seat members provided in the housing; and the pressure regulating member may cut off the fuel introduction passage and the fuel discharge passage from each other when the plate member sits on the plurality of annular valve seat portions. With these configurations, a pressure regulating member can be realized that communicates the fuel introduction passage and the fuel discharge passage with each other and cuts off the fuel introduction passage and the fuel discharge passage from each other according to the pressure of fuel introduced into the housing.

In the pressure regulating device having the above-described configuration, the fuel introduction passage and the plurality of discharge passage portions may be compartmentalized by a plurality of annular valve seat members provided in the housing; and the discharge passage portion that is subjected to the fuel discharge restriction by the discharge restricting mechanism may be disposed to be adjacent to the fuel introduction passage. With such a configuration, it is not necessary to provide a special passage to introduce the fuel into the discharge passage portion that will be subjected to discharge restriction and the configuration is simplified.

In the pressure regulating device having the above-described configuration, the plurality of annular valve seat members may be constituted by large-diameter and small-diameter tubular members provided coaxially with each other in the housing. As a result, a plurality of fuel passages can be easily formed at one surface side of the pressure regulating member and a simple pressure regulating device that can be stably operated is obtained.

In the pressure regulating device having the above-described configuration, when a fuel pump that supplies the pressurized fuel to the fuel consuming unit is to be stopped, the discharge restricting mechanism may cancel the restriction prior to the stop. With such a configuration, the pressure of fuel on the fuel introduction passage side that is the object of pressure regulation can be maintained at a high pressure level when the fuel pump is stopped.

In accordance with the invention, set pressure switching can be performed by selectively restricting the discharge of fuel from a plurality of discharge passage portions with the discharge restricting mechanism. Therefore, it is not necessary to introduce the fluid to both surface sides of the pressure regulating member, and the number of pipes and seal locations can be reduced. As a result, it is possible to provide a compact low-cost pressure regulating device with a simple pipe configuration that is suitable for set pressure switching.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3A illustrates a pressure receiving region on one surface of the pressure regulating member when the set pressure is a high set pressure; FIG. 3B is an enlarged cross-sectional view of the vicinity of the pressure receiving region of the pressure regulating member;

FIG. 4 is an explanatory drawing illustrating a pressure receiving region of the pressure regulating member when the set pressure is a low set pressure in the pressure regulating device according to the first embodiment of the invention;

FIG. 6A illustrates a pressure receiving region when the set pressure is the high set pressure; FIG. 6B illustrates a pressure receiving region when the set pressure is the low set pressure;

DETAILED DESCRIPTION OF EMBODIMENTS

The preferred embodiments of the invention will be described below with reference to the appended drawings.

(First Embodiment) FIGS. 1 to 4 illustrate the pressure regulating device according to the first embodiment of the invention.

In the first embodiment, the invention is applied to a pressure regulating device that regulates a pressure of fuel supplied to the internal combustion engine of a vehicle. This pressure regulating device is constituted as part of the so-called in-tank fuel supply system. Thus, in the embodiment, the fuel tank structure (the specific structure is not shown in the figure) is provided with a fuel pump and a pressure regulator accommodated in a sub-tank located inside a fuel tank, and a jet pump is further provided for transferring the fuel into the sub-tank.

First, the configuration of the embodiment will be explained below.

Figure 1:
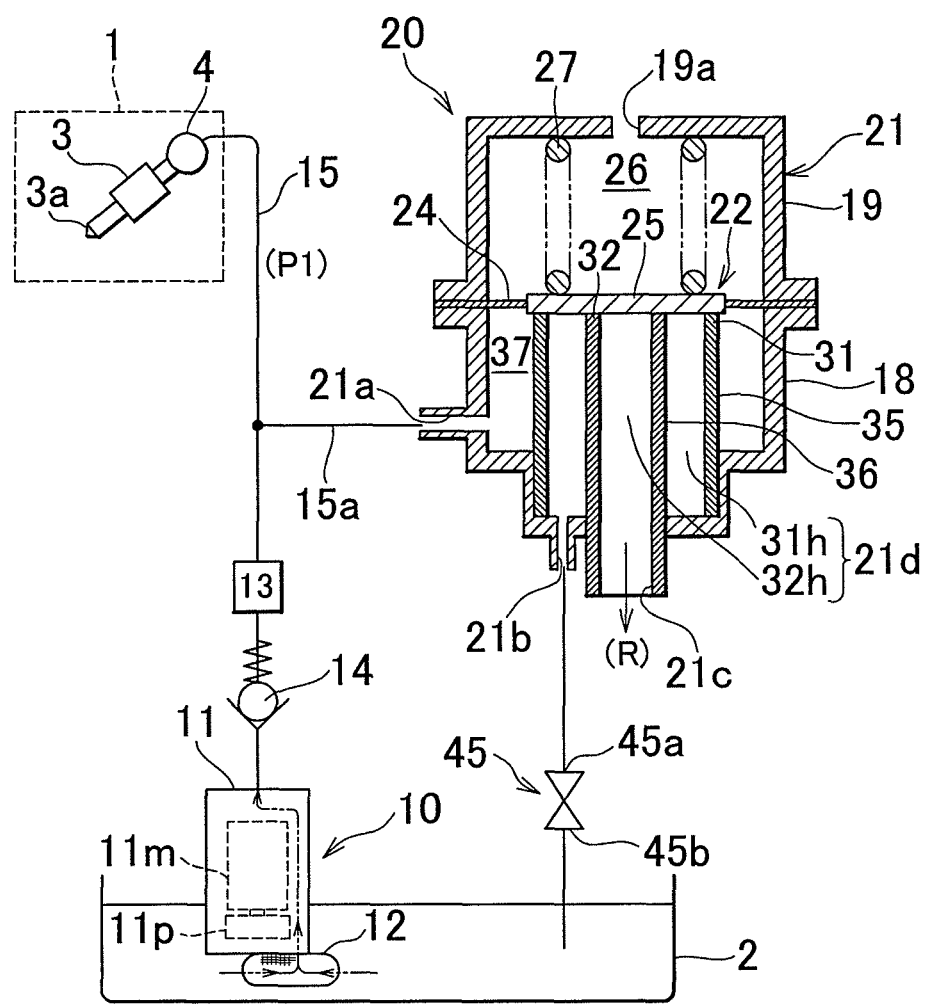
FIG. 1 is a schematic configuration diagram of a principal portion of the pressure regulating device according to the first embodiment of the invention.
Figure 2:
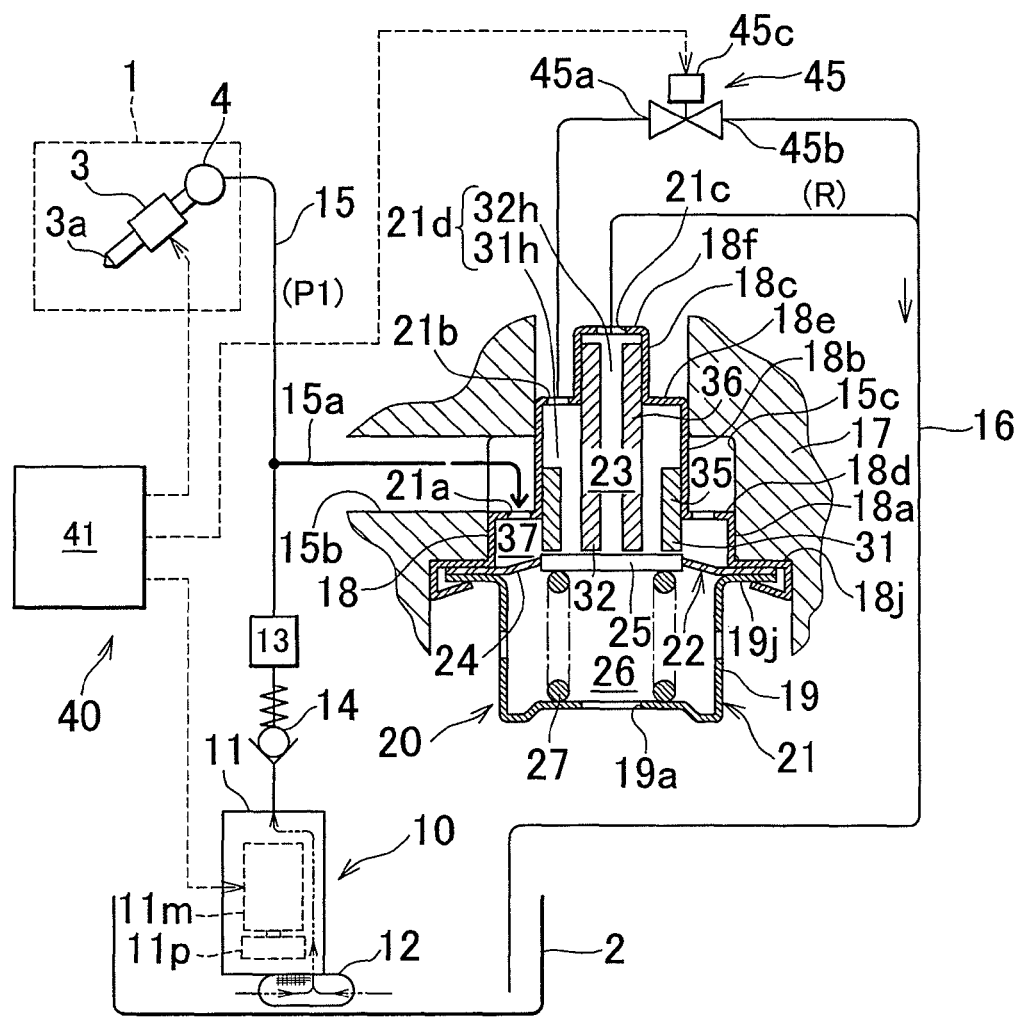
FIG. 2 is a configuration diagram of the entire pressure regulating device according to the first embodiment of the invention.

As shown in FIGS. 1 and 2, the fuel supply system of the embodiment includes a fuel tank 2 that stores a fuel, for example gasoline, that is consumed by an engine 1 (fuel consuming unit) that is an internal combustion engine, a fuel pumping circuit 10 that supplies, by pumping, the fuel stored in the fuel tank 2 into a plurality of injectors 3 (fuel injection valves; only one is shown in the figure) installed at the engine 1, a pressure regulator 20 that introduces the fuel supplied from the fuel pumping circuit 10 to the injector 3, regulates the introduced pressure to a preset system pressure P1, and switches the system pressure P1 between a high set pressure and a low set pressure, that is, performs variable control of the system pressure P1, and a set pressure switching mechanism 40 that performs switching control of the set pressure of the pressure regulator 20 to either set pressure from the high set pressure and low set pressure.

The engine 1 is, for example, a multicylinder four-cycle gasoline engine. The injectors 3 are provided correspondingly to a plurality of cylinders of the engine 1, and, for example, the end portions 3a on the injection port side thereof are exposed inside intake ports (not shown in the figure) of a plurality of cylinders. Further, the fuel from the fuel pumping circuit 10 is distributed via a delivery pipe 4 to each injector 3.

The fuel pumping circuit 10 is constituted by a fuel pump 11 that sucks in, pressurizes, and discharges the fuel located in the fuel tank 2, a suction filter 12 that is disposed on the intake port side of the fuel tank 11 and prevents foreign matter from being sucked in, a fuel filter 13 that removes foreign matter located in the discharged fuel on the discharge port side of the fuel pump 11, and a check valve 14 (counterflow preventing valve) positioned on the downstream of the fuel filter 13.

The fuel pump 11 (detailed configuration thereof is not shown in the figure) includes a pump actuation portion 11p that has an impeller for pump actuation and an incorporated DC motor 11m that drives the pump actuation portion 11p. The fuel pump 11 sucks up, as shown by a virtual line in FIG. 1, the fuel located in the fuel tank 2, pressurizes and then discharges the fuel. The discharge range of the fuel pump 11 per unit time is variably controlled by changing the rotation speed (rpm) of the incorporated motor 11m. The check valve 14 is open in the direction of fuel supply from the fuel pump 11 into the injector 3 and closed in the counterflow direction from the injection 3 into the fuel pump 11, thereby preventing the counterflow of the pressurized supplied fuel.

The fuel pump 11 also actuates and stops driving and changes the fuel discharge amount per unit time by controlling the energizing of the incorporated motor 11m with the below-described electronic control unit (referred to hereinbelow as ECU) 41.

The pressure regulator 20 is provided with a housing 21 having a communication hole 21a for the fuel introduction that serves to introduce the fuel and a plurality of communication holes 21b, 21c for the fuel discharge that serve to discharge the fuel. The housing 21 is produced by caulking together a pair of concave housing members 18, 19 at the outer circumferential flange portions 18j, 19j thereof. The communication holes 21a may have an opening of any shape and may be provided equidistantly in the circumferential direction of the housing 21 or at least one such communication hole may be provided at any position in the outer circumferential direction of the housing 21. Further, the housing members 18, 19 are obtained by pressing, for example steel sheets or stainless steel sheets, into a concave shape, but may be also molded to obtain the shape shown in the figure.

As shown in FIGS. 1 and 2, a pressure regulating member 22 that compartmentalizes the interior of the housing 21 into two chambers is provided inside the housing 21. The pressure regulating member 22 forms a pressure regulating chamber 23 that communicates with the communication hole 21a between one surface (first surface) and the housing 21 inside the housing 21. The pressure regulating member 22 shifts to an opening degree corresponding to the fuel pressure introduced into the pressure regulating chamber 23 in the valve opening direction that causes the communication hole 21a for the fuel introduction to communicate with the communication holes 21b, 21c for the fuel discharge. In the pressure regulating member 22, a flexible annular membrane member 24 is integrally assembled (integrated) with a substantially round plate member 25 positioned on the inner circumferential side of the annular membrane member 24. As a result, the annular membrane member 24 receives at all times (described hereinbelow in greater detail) at one side thereof (the surface on the first surface side) the pressure of fuel introduced into the pressure regulating chamber 23 from the communication hole 21a for the fuel introduction.

Further, in the pressure regulating member 22, a back pressure chamber 26 is formed between the other surface (second surface) of the pressure regulating member 22 and the housing 21. A compression coil spring 27 (elastic member) serving as an impelling mechanism that impels a plate member 25 of the pressure regulating member 22 in the valve opening direction is provided inside the back pressure chamber 26. Further, at least one atmospheric air introduction port 19a is formed in one housing member 19 that forms together with the pressure regulating member 22 the back pressure chamber 26.

More specifically, the annular membrane member 24 of the pressure regulating member 22 is constituted by a flexible diaphragm obtained, for example, by integrally bonding a rubber layer (for example, a hydrogenated nitrile rubber or a fluororubber) that is unlikely to deteriorate under the effect of fuel to a base cloth material layer (for example, polyamide synthetic fibers). The plate member 25 of the pressure regulating member 22 is constituted, for example, by a substantially disk-shaped plate made from a metal (for example, tool steel or stainless steel) supported in the central portion of the annular membrane member 24.

An outer annular valve seat portion 31 and an inner annular valve seat portion 32 are disposed substantially concentrically inside the housing 21. The annular valve seat portions 31, 32 and the plate member 25 constitute a pressure regulating valve mechanism that is opened and closed by the relative displacement of the outer annular valve seat portion 31, inner annular valve seat portion 32, and plate member 25. The outer annular valve seat portion 31 and the inner annular valve seat portion 32 are examples of a plurality of annular valve seat members facing the plate member 25 of the pressure regulating member 22 inside the pressure regulating chamber 23.

More specifically, the outer annular valve seat portion 31 and the inner annular valve seat portion 32 are constituted by a large-diameter outer tubular member 35 and a small-diameter inner tubular member 36 having mutually different diameters and disposed concentrically inside the housing 21. Further, on the inner circumferential side of the outer tubular member 35 corresponding to the annular valve seat portion 31, a tubular intermediate fuel passage 31h (first discharge passage portion) communicating with the communication hole 21b for the fuel discharge is formed between the outer tubular member 35 and the inner tubular member 36, whereas on the outer circumferential side of the outer tubular member 35, an annular outer fuel passage 37 (fuel introduction passage) communicating with the communication hole 21a for the fuel introduction is formed between the housing 21 and the pressure regulating member 22.

On the inner circumferential side of the inner tubular member 36 corresponding to the inner annular valve seat portion 32, a round columnar inner fuel passage 32h (second discharge passage portion) communicating with the communication hole 21c is formed on the inside, in the diametrical direction, of the intermediate fuel passage 31h. The inner fuel passage 32h is opened at all times inside the fuel tank 2 through the communication hole 21c and constitutes a fuel discharge passage 21d through which, and also through the intermediate fuel passage 31h, the fuel located inside the pressure regulating chamber 23 is discharged to the outside of the housing 21.

Further, when the plate member 25 shifts with respect to the outer annular valve seat portion 31 and the inner annular valve seat portion 32, the opening degree of the intermediate fuel passage 31h and the inner fuel passage 32h at the respective inner end side that is opened inside the pressure regulating chamber 23 changes according to the displacement amount. The inner and outer circumferential edge portions of the outer annular valve seat portion 31 and the inner annular valve seat portion 32 are chamfered.

Thus, the annular outer fuel passage 37, intermediate fuel passage 31h, and inner fuel passage 32h are compartmentalized diametrically by a plurality of annular valve seat portions 31, 32 provided in the housing 21. Further, the intermediate fuel passage 31h (discharge passage portion in which the discharge of fuel is restricted) and the annular outer fuel passage 37 are disposed adjacently so that the annular valve seat portion 31 is interposed therebetween.

In the embodiment, the fuel discharged into the intermediate fuel passage 31h and the inner fuel passage 32h fills these fuel discharge passages 31h, 32h in a low-pressure state corresponding to the atmospheric pressure or a pressure inside the fuel tank 2 according to the arrangement position and arrangement posture of the pressure regulator 20.

Figure 3A:
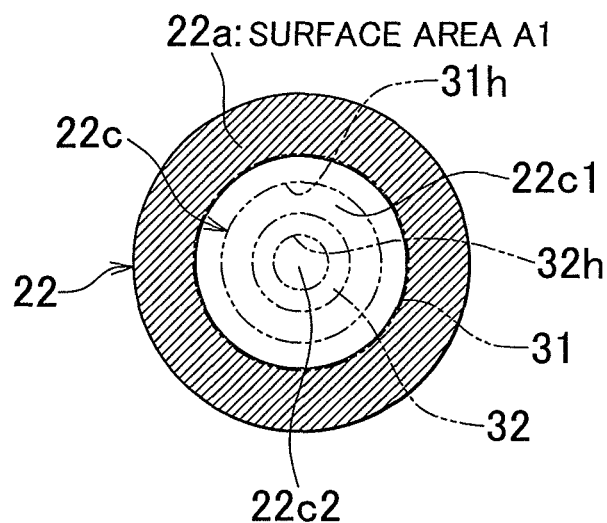
FIGS. 3A and 3B are explanatory drawings illustrating the arrangement of the pressure receiving region of the pressure regulating member in the pressure regulating device according to the first embodiment of the invention.
Figure 3B:
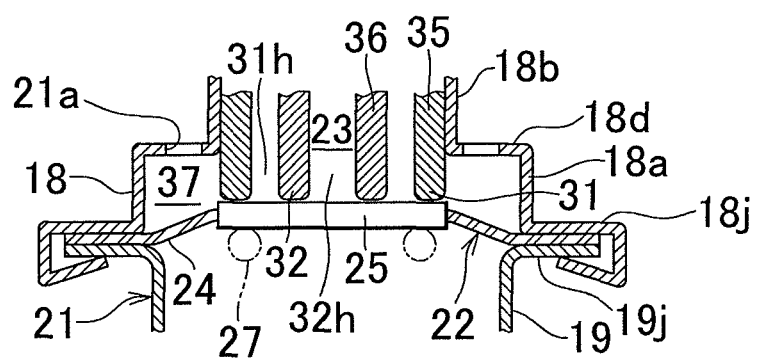

As shown in FIG. 3A, the pressure regulating member 22 has a pressure receiving surface portion 22a that receives the pressure of fuel introduced into the outer fuel passage 37 and a passage closing surface portion 22c. The passage closing surface portion 22c closes the inner end portion of the intermediate fuel passage 31h and the inner fuel passage 32h when the surface of the plate member 25 on the first surface side that serves as a valve surface seats on the annular valve seat portion 31. On the other hand, the passage closing surface portion 22c opens the inner end portion of the intermediate fuel passage 31h and the inner fuel passage 32h to an opening degree corresponding to the displacement amount of the plate member 25 of the pressure regulating member 22 in the valve opening direction.

Thus, the pressure regulating member 22 receives the impelling force in the valve opening direction (direction in which the outer fuel passage 37 is communicated with the fuel discharge passages 21d) based on the pressure of fuel introduced in the pressure regulating chamber 23 inside the housing 21 and the impelling force in the valve closing direction (direction in which the communication of the outer fuel passage 37 with the fuel discharge passages 21d is cut off) from the compression coil spring 27. The pressure regulating member 22 communicates the outer fuel passage 37 for the fuel introduction with the intermediate fuel passage 31h and the inner fuel passage 32h for the fuel discharge, that is, the fuel discharge passages 21d, and cuts off the outer fuel passage 37 and the fuel discharge passages 21d from each other, according to the impelling force in the valve opening direction and the impelling force in the valve closing direction.

The pressure receiving surface portion 22a of the pressure regulating member 22 is formed around the plate member 25 by the annular membrane member 24, which is liquid-tightly (gas-tightly) joined to the outer circumferential portion of the plate member 25 and supported on the housing 21. The pressure receiving surface portion 22a receives at all times the pressure of fuel inside the annular outer fuel passage 37 within a range of the pressure receiving surface area A1 shown by hatching in FIG. 3A.

Further, an annular pressure receiving surface portion 22c1, which is part of the passage closing surface portion 22c of the pressure regulating member 22 and closes the intermediate fuel passage 31$h$, receives the pressure of fuel inside the intermediate fuel passage 31$h$. A central round pressure receiving surface portion 22$c$2, which is part of the passage closing surface portion 22$c$ of the pressure regulating member 22 and closes the inner fuel passage 32$h$, receives the pressure of fuel inside the inner fuel passage 32$h$. However, since the inner fuel passage 32$h$ is opened inside the fuel tank 2 at all times, the central round pressure receiving surface portion 22$c$2 receives the pressure corresponding to the internal pressure (for example, atmospheric pressure) of the tank 2 and is substantially not pressurized.

As shown in FIGS. 1 and 2, a normally closed cut-off valve 45 is provided as a discharge restricting means (a discharge restricting mechanism) for restricting the discharge of fuel from the intermediate fuel passage 31$h$ into the fuel tank 2 on the downstream of the intermediate fuel passage 31$h$ (somewhere downstream of the intermediate fuel passage 31$h$ or somewhere in the intermediate fuel passage 31$h$).

When the cut-off valve 45 is closed, the passage on the downstream of the intermediate fuel passage 31$h$ is closed, and when the valve is open, the passage on the downstream of the intermediate fuel passage 31$h$ is open inside the fuel tank 2. The opening and closing of the valve is controlled by control signals from the ECU 41.

As shown in FIG. 2, the cut-off valve 45 has a first port 45$a$ connected to the intermediate fuel passage 31$h$ via the communication hole 21$b$ for the fuel discharge, a second port 45$b$ connected to the downstream discharge fuel passage 16, and an electromagnetic operation portion 45$c$ that switchingly operates the communication state between these first and second ports 45$a$, 45$b$. Further, depending on whether or not the ON state of the operation signal is assumed, the electromagnetic operation portion 45$c$ communicates the second port 45$b$ with the first port 45$a$ in the ON state the operation signal and cuts off the second port 45$b$ from the first port 45$a$ in the OFF state of the operation signal. Where the operation signal is in the ON state, the energizing drive current is supplied from the ECU 41 side to the electromagnetic operation portion 45$c$. Where the operation signal is in the OFF state, the energizing drive current is not supplied from the ECU 41 side to the electromagnetic operation portion 45$c$. Therefore, the first port 45$a$ and the second port 45$b$ of the cut-off valve 45 correspond to the inlet port and outlet port of the opening-closing valve that is opened and closed on the downstream of the intermediate fuel passage 31$h$.

Where the cut-off valve 45 closes the passage on the downstream of the intermediate fuel passage 31$h$, the fuel inside the intermediate fuel passage 31$h$ is pressurized by the fuel discharged from the outer fuel passage 37. Thus, when the passage on the downstream of the intermediate fuel passage 31$h$ is closed by the cut-off valve 45, the annular pressure receiving surface portion 22$c$1 of the passage closing surface portion 22$c$ of the pressure regulating member 22 that corresponds to the intermediate fuel passage 31$h$ receives the pressure of fuel pressurized inside the intermediate fuel passage 31$h$. In this case, the substantial pressure receiving surface area of the pressure regulating member 22 is not merely the pressure receiving surface area A1 of the pressure receiving surface portion 22$a$, but is increased by the surface area A2 to the annular pressure receiving surface portion 22$c$1 (see the hatched pressure receiving surface area A1+A2 in FIG. 4).

Thus, the pressure receiving surface area at the surface (first surface) opposite the surface (second surface) of the pressure regulating member 22 that is impelled in the all-time valve closing direction by the compression coil spring 27 is switched between the pressure receiving surface area A1 in the open state of the cut-off valve 45 and the pressure receiving surface area A1+A2 in the closed state of the cut-off valve 45. As a result, the pressure of fuel inside the outer fuel passage 37, that is pressurized by the compression coil spring 27 via the pressure regulating member 22, is set such that the fuel pressure in the closed state of the cut-off valve 45 is lower than the fuel pressure in the open state of the cut-off valve by a ratio A1/(A1+A2). Thus, where the set pressure on the low pressure side (the low set pressure) of the pressure regulator 20 is denoted by L and the set pressure on the high pressure side (the high set pressure) is denoted by H, the ratio L/H of the set pressures is set to the pressure receiving surface area ratio A1/(A1+A2), which is a variable ratio of pressure receiving surface areas in the open and closed states of the cut-off valve 45.

Thus, in the embodiment, the fuel discharge passage 21$d$ for discharging the fuel located inside the housing 21 to the outside includes the intermediate fuel passage 31$h$ and the inner fuel passage 32$h$ serving as a plurality of discharge passage portions configured to pass the fuel introduced in the outer fuel passage 37. Further, the cut-off valve 45 (discharge restricting means, opening-closing valve) that restricts the discharge of fuel from either of the two fuel passages 31$h$, 32$h$ (at least one of them), for example, the intermediate fuel passage 31$h$, which is one discharge passage portion, is provided on the downstream of the intermediate fuel passage 31$h$. The cut-off valve 45 changes the internal cross-sectional area thereof from a maximum in the open valve state to a minimum in the closed valve state, thereby changing the cross-sectional areas of the two fuel passages 31$h$, 32$h$ relative to each other. As a result, the discharge of fuel from the two fuel passages 31$h$, 32$h$ can be selectively restricted to a state in which the fuel is discharged only from the inner fuel passage 32$h$.

Returning to FIG. 2, one housing member 18 of the housing 21 is formed in a multistage stepped concave shape such that becomes deeper in the radial inward direction, and the outer tubular member 35 and the inner tubular member 36 constituting the outer annular valve seat portion 31 and the inner annular valve seat portion 32 are fixed at different radial positions to the housing member 18. The housing member 18 of the housing 21 has a first annular wall portion 18$a$ withdrawing on the diametrical outside from the outer tubular member 35, a second annular wall portion 18$b$ supporting the outer tubular member 35, and the third annular wall portion 18$c$ supporting the inner tubular member 36. The housing member 18 also has a first stepped wall portion 18$d$ connecting the first annular wall portion 18$a$ with the second annular wall portion 18$b$, a second stepped wall portion 18$e$ connecting the second annular wall portion 18$b$ with the third annular wall portion 18$c$, and a third stepped wall portion 18$f$ connected to the outer end portion of the third annular wall portion 18$c$.

The communication hole 21$a$ for the fuel introduction that is formed in the housing 21 is opened at the first stepped wall portion 18$d$ of the housing member 18 on the outer circumferential surface side (diametrically outer side) of the outer tubular member 35. The communication hole 21$b$ for the fuel discharge that is formed in the housing 21 is opened at the second stepped wall portion 18$e$ on the inner circumferential surface side (diametrically inner side) of the outer tubular member 35. Further, the outer fuel passage 37 is formed by the housing member 18, pressure regulating member 22, and outer tubular member 35. The outer fuel passage 37 intakes the fuel from the communication hole 21$a$ for the fuel introduction, and receives the pressure of the fuel by the pressure receiving surface portion 22$a$. The intermediate fuel passage 31*h* is formed in a substantially cylindrical shape between the outer tubular member 35 and the inner tubular member 36 and communicates with the communication hole 21*b* for the fuel discharge of the housing 21. The inner fuel passage 32*h* is formed in a substantially round columnar shape inside the inner tubular member 36. The central communication hole 21*c* communicating with the inner fuel passage 32*h* of the annular valve seat portion 32 is formed in the third stepped wall portion 18*f* of the housing member 18.

The communication hole 21*a* for the fuel introduction side is connected to the branched passage 15*a* (branched passage on the supply side) of the fuel passage 15, which is circuit portion downstream of the check valve 14 of the fuel pumping circuit 10. The branched passage 15*a* of the fuel passage 15 constitutes a fuel pipe path portion between the delivery pipe 4 and the check valve 14 The branched passage 15*a* has, for example, a branch portion 15*b* formed in a portion 17 (only part thereof is shown in FIG. 2) of the filter case that accommodates the filter elements (not shown in the figure) of the suction filter 12 and the fuel filter 13 together with the fuel pump 11, and an annular passage portion 15*c* formed between the portion 17 of the filter case and the housing 21. The downstream discharge passage 16 is connected to the central communication hole 21*c* of the housing 21 that communicates with the inner fuel passage 32*h*.

However, as described hereinabove, the set pressure of the pressure regulator 20 (set value of fuel pressure that should be regulated) is switched between the low set pressure and the high set pressure. The low set pressure corresponds, for example, to a fuel supply pressure during normal operation of the engine 1. The high set pressure of the pressure regulator 20 is higher than the low set pressure and corresponds to a fuel pressure that is maintained within the below-described remaining pressure holding zone when the engine 1 is stopped, for example during an idling stop, or to a fuel supply pressure necessary when a load is high. The remaining pressure holding zone as referred to herein is a passage zone that is formed on the upstream of the injector 3 and downstream of the check valve 14 within the fuel passage 15 when the fuel pump 11 is stopped and holds the fuel pressure by an impelling force from the compression coil spring 27 via the pressure regulating member 22, while communicating with the outer fuel passage 37.

The high set pressure is, for example, 400 kPa (gauge pressure; same hereinbelow) and set to a fuel pressure (usually equal to or higher than 324 kPa) at which fuel vapor is unlikely to be generated even when the fuel temperature inside the delivery pipe 4 is high immediately after the engine has been stopped. The low set pressure is, for example, 200 kPa and set to a fuel pressure at which fuel vapor is unlikely to be generated even when the fuel temperature inside the delivery pipe 4 is comparatively low when the vehicle travels.

The ECU 41 is constituted, for example, by a Central Processing Unit (CPU), Read Only Memory (ROM), Random Access Memory (RAM), a backup memory including a nonvolatile memory, and also by an input interface circuit and an output interface circuit. ON/OFF signals of the ignition switch of the vehicle are fetched to the ECU 41 and power is supplied thereto from the battery. A group of sensors are connected to the input interface circuit of the ECU 41, and sensor information from the sensors is fetched to the ECU 41 via the input interface circuit including an A/D converter and the like. A relay switch, a switching element, and a drive circuit are provided in the output interface circuit of the ECU 41 to control actuators such as the injector 3, fuel pump 11, and cut-off valve 45.

Further, by executing a control program stored in the ROM, the ECU 41 switches the cut-off valve 45 to the ON state (open valve state) immediately before the supply of fuel is initiated to start the engine 1 or immediately before the engine 1 is stopped and regulates the fuel from the fuel pump 11 to the high set pressure in the pressure regulating chamber 23 on the basis of the sensor information from the sensor, set values that have been stored in advance in the ROM or backup memory, and map information. Further, the ECU 41 repeatedly determines a load state of the engine 1 during engine operation, and switches the cut-off valve 45 to the OFF state and regulates the pressure of fuel supplied from the fuel pump 11 to the injector 3 to the low set pressure inside the pressure regulating chamber 23 in the region of operation under a partial load that takes most of the operation state after the engine has been started, that is, in the region of normal operation, which is not a high-load operation, after the engine has been started. For this purpose, the set pressure on the high pressure side and the set pressure on the low pressure side of the fuel pressure are included in the set values stored in the ROM and backup memory of the ECU 41, and an operation region determination map for determining the operation load and performing switching control of fuel pressure corresponding to the determination results is included in the map information stored in the ROM and backup memory.

The start time as referred to herein is, for example, a point of time in which an ignition ON request for starting the engine is generated, such as a point of time in which the ignition key is operated to a start position and an ignition ON request is generated, a point of time in which the engine 1 is temporarily stopped and then restarted in a vehicle executing the conventional idling stop, or a point of time in which the engine 1 is temporarily stopped and then restarted to increase the efficiency of a hybrid power unit in a vehicle equipped with such a unit.

A method for controlling the fuel pressure in the pressure regulator of the embodiment will be described below in greater detail.

When the engine 1 has been stopped for a long time, in the pressure regulator of the embodiment having the above-described configuration, the fuel pump 11 of the fuel pumping circuit 10 that is the object of pressure regulation is in the fuel supply stop state, the discharge fuel pressure thereof is 0 kPa (gauge), and the cut-off valve 45 is in the OFF state. In the OFF state, the electromagnetic operation portion 45*c* of the cut-off valve 45 is not energized.

In this case, the cut-off valve 45 is in the closed valve state in which the first port 45*a* and the second port 45*b* are cut off, but because the fuel pump 11 is in the fuel supply stop state, the substantial pressure receiving region in which the pressure regulator 22 receives the fuel pressure in the valve opening direction is only the pressure receiving surface portion 22*a* that receives the fuel pressure inside the annular outer fuel passage 37. Further, the fuel pressure P1 in the remaining pressure holding zone from the check valve 14 to the injector 3 that is the pressure of fuel supply to the injector 3 is equal to the fuel pressure inside the outer fuel passage 37.

After the plate member 25 of the pressure regulating member 22 has sat on the outer annular valve seat portion 31 and the inner annular valve seat portion 32 under the effect of the impelling force of the compression coil spring 27, the fuel pressure P1 inside the outer fuel passage 37 is a pressure at which the impelling force in the valve opening direction that corresponds to a product of the fuel pressure P1 acting on the pressure regulating member 22 from the outer fuel passage 37 side and the pressure receiving surface area A1 of the pressure receiving surface portion 22*a* is equal to or less than the impelling force in the valve closing direction applied from the compression coil spring 27 (P1≦H). However, the fuel pressure P1 immediately before the operation of the engine 1 is stopped assumes a value that is higher than the low set pressure L and equal to or lower than the high set pressure H (L≦P1≦H) because this is a state after the ON state has been temporarily assumed immediately before the engine 1 is stopped, as will be described hereinbelow. The operations performed when the engine 1 is stopped and immediately after the stop will be described below.

When the engine 1 is started, the cut-off valve 45 is initially energized by the ECU 41 prior to the start. Thus, the cut-off valve 45 is switched to the temporary ON state before the fuel supply is started by the fuel pump 11 and the discharge pressure thereof rises.

At this time, the cut-off valve 45 communicates the second port 45b with the first port 45a. The fuel pump 11 is still in the fuel supply stop state.

In this state, the fuel pressure inside the intermediate fuel passage 31h is released (P=0 kPa) and the pressure regulating member 22 assumes a state of contact with the annular valve seat portions 31, 32. Therefore, the fuel pressure P1 in the remaining pressure holding zone from the check valve 14 to the injector 3 is held at the preceding pressure level, that is, the fuel pressure that is equal to or higher than the low set pressure L and equal to or lower than the high set pressure H (L≦P1≦H).

Where the fuel pump 11 is then started, the fuel from the fuel pump 11 is supplied into the remaining pressure holding zone, and the fuel pressure inside the outer fuel passage 37 promptly reaches the high set pressure H.

Thus, before the impelling force in the valve opening direction that acts from the outer fuel passage 37 side on the pressure regulating member 22 reaches the impelling force in the valve closing direction from the compression coil spring 27, the fuel pressure inside the outer fuel passage 37 promptly rises and the excess pressurized fuel is discharged into the intermediate fuel passage 31h. The impelling force in the valve closing direction from the compression coil spring 27 corresponds to the product of the high set pressure H and the pressure receiving surface area A1 of the first pressure receiving surface portion 22a.

The engine 1 is then started. At this time, the high-pressure fuel that has been pressurized to the high set pressure H is supplied to the injector 3, thereby enhancing the atomization of fuel sprayed from the injector 3 inside the fuel chamber of the engine 1. It goes without saying that the control similar to the above-described control performed when the engine is started may be also implemented when the engine 1 is restarted.

The operation state after the engine 1 has been started is usually mainly a partial load operation state, except a special operation state in which a high fuel pressure is required such as a state when a request for high-load operation is issued. During such usual operation, a low set pressure is required to ensure low fuel consumption of the engine 1 and reliability of the fuel pump 11.

During the usual operation, the energizing of the cut-off valve 45 from the ECU 41 is stopped and the operation of the fuel pump 11 is continued. Therefore, when the engine 1 makes a transition to the usual operation after being started, the cut-off valve 45 is switched to the OFF state.

During operation of the engine 1, the ECU 41 determines which operation region that has been stored in advance as map information corresponds to the operation state required for the engine 1 on the basis of the accelerator pedal operation amount inputted by the driver and the operation state such as the vehicle speed or the rotation speed of the engine 1 obtained from the sensor information. Then, the ECU 41 controls the energizing of the cut-off valve 45 and the energizing of the fuel pump 11 so as to obtain the fuel pressure adapted to the required operation state.

During normal operation of the engine 1, the cut-off valve 45 is in the OFF state (closed valve state). Therefore, the pressurized fuel from the fuel pump 11 is introduced in the outer fuel passage 37 and this excess fuel is discharged into the intermediate fuel passage 31h, which is the first discharge fuel portion, thereby increasing the fuel pressure inside of both the outer fuel passage 37 and the intermediate fuel passage 31h. At this time, the pressure regulating member 22 receives an impelling force H×A1 in the valve closing direction from the compression coil spring 27, but also receives an impelling force P1×A1 in the valve opening direction at the pressure receiving surface portion 22a that is acted upon by the fuel pressure P (=P1) inside the outer fuel passage 37 and an impelling force P1×A2 in the valve opening direction at the annular pressure receiving surface portion 22c1 of the passage closing surface portion 22c that is acted upon by the fuel pressure P1 inside the intermediate fuel passage 31h. Accordingly, the fuel pressure is regulated to balance the impelling force H×A1 in the valve closing direction and the impelling force P1 (A1+A2) in the valve opening direction.

As a consequence, the supplied fuel pressure P1 at this time becomes P1=H×A1/(A1+A2) in the valve closing direction, that is, the low set pressure L. Therefore, where the high set pressure H is 400 kPa and the ratio A1/A2 of the pressure receiving surface areas is taken as 1, the supplied fuel pressure P1 at this time will be the set pressure L of 200 kPa.

When the operation state required for the engine 1 enters a high-load operation region due to changes in the vehicle travel environment or operational input from the driver operating the vehicle, the ECU 41 switches the cut-off valve 45 to the ON state (open valve state) and also maintains the operation of the fuel pump 11.

At this time, the intermediate fuel passage 31h is opened and the fuel pressure inside the intermediate fuel passage 31h is released in the same manner as when the engine 1 is started as described hereinabove.

Since the operation of the fuel pump 11 is maintained, the fuel pressure P1 inside the outer fuel passage 37 of the pressure regulator 20 promptly rises to the high set pressure H. Therefore, a fuel injection amount sufficient to fulfill the high-load requirement will be ensured.

When the engine 1 is stopped, the ECU 41 temporarily switches the cut-off valve 45 to the ON state immediately before the engine 1 is stopped and releases the fuel pressure inside the intermediate fuel passage 31h. For example, where the driver operates the ignition key to the ignition OFF position and an ignition OFF request requiring to stop the engine 1 is generated, the cut-off valve 45 is initially energized and the cut-off valve 45 assumes the ON state. Then, after a time interval elapses that is sufficient for the pressure regulating member 22 located inside the pressure regulator 20 to stabilize in the ON state posture, the processing necessary to stop the engine 1 is executed.

Immediately after the engine 1 has been stopped, the cooling of the engine 1 by cooling water or cooling air is stopped, thereby increasing the temperature of fuel in the remaining pressure holding zone from the check valve 14 in the fuel supply path to the injector 3. At this time, the fuel pressure P1 in the remaining pressure holding zone is equal to the fuel pressure P in the outer fuel passage 37 of the pressure regulator 20. The fuel pressure P in the outer fuel passage 37 is in the state in which the elastic pressurization by the flexible annular membrane member 24 of the pressure regulating member 22 at the pressure receiving surface portion 22a acts to rise this pressure to reach the high set pressure H. Therefore, when the temperature of fuel in the remaining pressure holding zone from the check valve 14 to the injector 3 rises, the vapor pressure of fuel in the remaining pressure holding zone also rises following this rise in temperature and the fuel pressure P1 rises to maintain the gas-liquid equilibrium. Therefore, the remaining pressure that suppress the generation of fuel vapor is effectively ensured and good high-temperature restart is enabled even when the fuel temperature inside the delivery pipe 4 immediately after the engine has been stopped is high.

The operation of the pressure regulating device of the embodiment will be described below.

In the above-described pressure regulating device of the embodiment, the pressure regulating member 22, which receives an impelling force in the all-time cut-off direction from the compression coil spring 27, changes the communication state of the outer fuel passage 37 with the intermediate fuel passage 31h and the inner fuel passage 32h according to the pressure of fuel introduced into the pressure regulating chamber 23. Further, the pressure of fuel introduced in the outer fuel passage 37 is regulated to a different set pressure depending on whether or not the discharge of fuel from the intermediate fuel passage 31h is restricted by the cut-off valve 45. Thus, the set pressure of the pressure regulator 20 can be switched by restricting with the cut-off valve 45 the discharge of fuel from the intermediate fuel passage 31h, which is at least one discharge passage portion from among the intermediate fuel passage 31h and the inner fuel passage 32h. Therefore, the pressure of fuel introduced into the outer fuel passage 37 can be switched to a high pressure and a low pressure at only one surface of the pressure regulating member 22, without introducing the fuel to both surfaces of the pressure regulating member 22, and the number of pipes and seal locations in the pressure regulator 20 can be decreased. As a result, a compact low-cost pressure regulating device with a simple pipe configuration that is suitable for set pressure switching is obtained.

Further, in the embodiment, a discharge restricting means for restricting the discharge of fuel from the intermediate fuel passage 31h can be constituted at a low cost by the cut-off valve 45 that reduces the internal passage cross-section area thereof on the downstream of the intermediate fuel passage 31h. In addition, since the cut-off valve 45 is an opening-closing valve performing simple opening-closing operations, a discharge restricting means of even lower cost can be obtained.

Further, the outer fuel passage 37, intermediate fuel passage 31h, and inner fuel passage 32h are compartmentalized by a plurality of annular valve seat portions 31, 32 provided in the housing 21, and the outer fuel passage 37 and the intermediate fuel passage 31h, which is a discharge passage portion in which fuel discharge is restricted, are disposed adjacently so that the outer annular valve seat portion 31 (annular valve seat member) is interposed therebetween. Therefore, it is not necessary to provide a special passage for introducing the fuel into the intermediate fuel passage 31h and a pressure regulating device of simple configuration can be obtained.

In addition, the outer annular valve seat portion 31 and the inner annular valve seat portion 32 are constituted by large-diameter and low-diameter tubular members 35, 36 provided coaxially with each other in the housing 21. Therefore, a plurality of fuel passages 37, 31h, 32h can be easily formed on one surface side of the pressure regulating member 22. Moreover, the pressure regulator 20 has a simple configuration and operates with good stability.

Further, in the embodiment, when the fuel pump 11 is stopped when the engine 1 is stopped, the cut-off valve 45 is temporarily controlled to the ON state immediately before the fuel pump 11 is stopped (prior to the stop) and the restriction on discharge from the intermediate fuel passage 31h is canceled. Therefore, although the fuel pump 11 is then stopped, the pressure of fuel on the outer fuel passage 37 side that is the pressure regulation object can be maintained at a high level and the restart performance of the engine 1 is improved.

Thus, with the pressure regulating device of the embodiment, set pressure switching of the pressure regulator 20 can be performed by limiting the fuel discharge from at least one of the intermediate fuel passage 31h and the inner fuel passage 32h, for example the intermediate fuel passage 31h, with the cut-off valve 45 that serves as a discharge restricting means/. Therefore, it is not necessary to introduce the fluid to both surface sides of the pressure regulating member 22 and the number of pipes and seal locations can be reduced. As a result, it is possible to provide a compact low-cost pressure regulating device with a simple pipe configuration that is suitable for set pressure switching.

Figure 5:
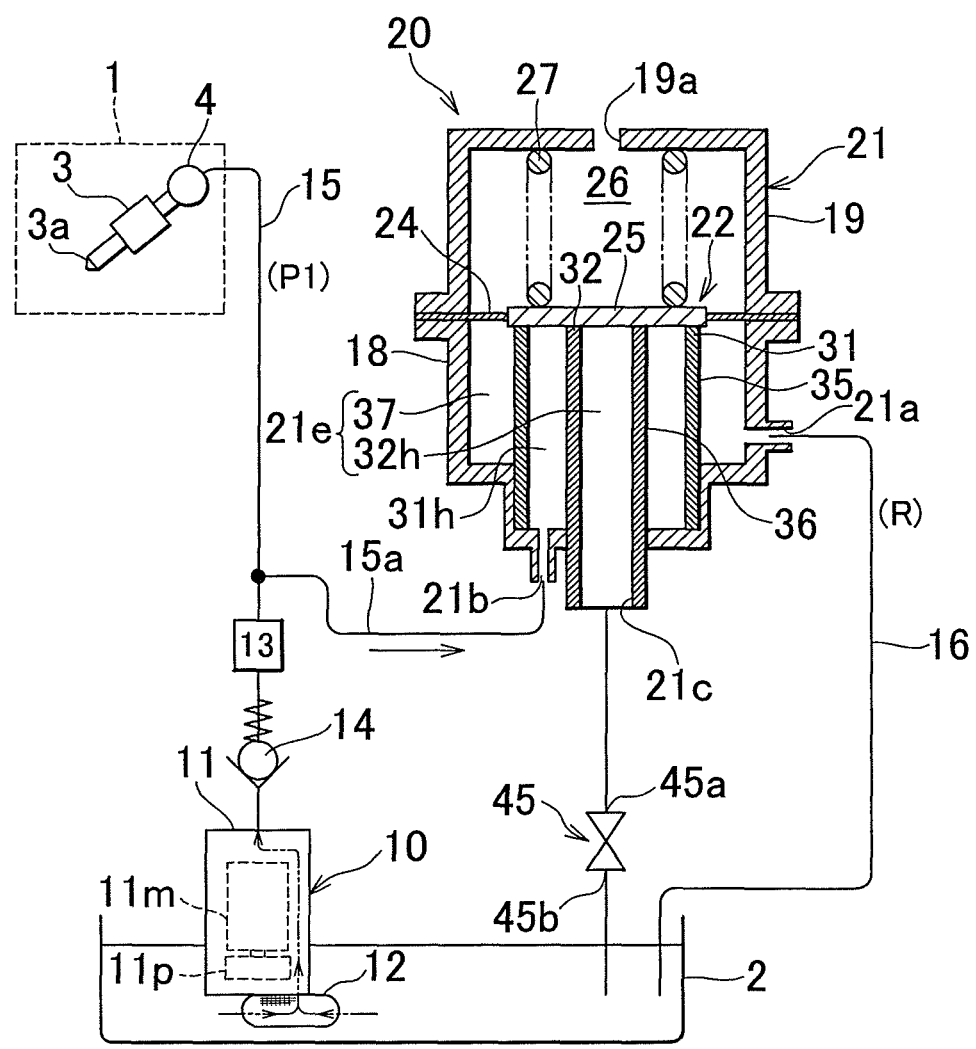
FIG. 5 is a schematic configuration diagram of a principal portion of the pressure regulating device according to the second embodiment of the invention.

(Second Embodiment) FIGS. 5 and 6 illustrate the pressure regulating device according to the second embodiment of the invention.

The device according to the embodiment has a configuration similar to that of the device according to the above-described first embodiment. Therefore, the difference with the above-described first embodiment will be described below, while assigning the constituent elements identical to those of the above-described first embodiment with reference numerals and symbols identical to those of the corresponding constituent elements shown in FIGS. 1 to 4.

In the pressure regulating device of the embodiment, as shown in FIG. 5, the connection mode of the fuel passage 15 and the cut-off valve 45 to the pressure regulator 20 is different from that of the first embodiment. Thus, excess fuel is discharged from the outermost communication hole 21a and the innermost communication hole 21c of the pressure regulator 20, and the fuel that is the object of pressure regulation is introduced into the pressure regulator 20 from the communication hole 21b positioned radially between the plurality of communication holes 21a, 21c.

Further, the pressure regulating member 22 shifts in the valve opening direction in which the communication hole 21b for the fuel introduction is communicated with the communication holes 21a, 21c for the fuel discharge so as to obtain an opening degree corresponding to the pressure of fuel introduced into the pressure regulating chamber 23. Further, the plate member 25 of the pressure regulating member 22 receives at all times the pressure of fuel introduced into the pressure regulating chamber 23 from the communication hole 21b for the fuel introduction at one first surface (surface on the first surface side).

Thus, in the embodiment, the pressure regulator 20 is provided with the housing 21 having the communication hole 21b for the fuel introduction into which the fuel is introduced and the communication holes 21a, 21c for the fuel discharge from which the fuel is discharged. Further, the inner fuel passage 32h, which is a discharge passage portion in which fuel discharge is restricted, is disposed to be adjacent from the inner side to the substantially cylindrical intermediate fuel passage 31h (fuel introduction passage) into which the fuel is introduced from the communication hole 21b for the fuel introduction, with the inner tubular member 36 being interposed between the inner fuel passage and the intermediate fuel passage. In addition, the outer fuel passage 37 in which fuel discharge is not restricted is disposed to be adjacent from the outer side to the intermediate fuel passage, with the outer tubular member 35 being interposed therebetween.

Thus, the outer tubular member 35 corresponding to the outer annular valve seat portion 31 forms on the inner circumferential side thereof, together with the inner tubular member 36, the tubular intermediate fuel passage 31h located therebetween and communicating with the communication hole 21b for the fuel introduction. The outer tubular member 35 also forms on the outer circumferential side thereof the annular outer fuel passage 37 (discharge passage portion) located between the housing 21 and the pressure regulating member 22 and communicating with the communication hole 21a for the fuel discharge. The outer fuel passage 37 is open at all times inside the fuel tank 2 via the communication hole 21a for the fuel discharge. Further, a round columnar inner fuel passage 32h (discharge passage portion) communicating with the communication hole 21c for the fuel discharge is formed on the inner side, in the diametrical direction, of the intermediate fuel passage 31h on the inner circumferential side of the inner tubular member 36 corresponding to the inner annular valve seat portion 32. The inner fuel passage 32h is connected to the first port 45a of the cut-off valve 45 via the communication hole 21c for the fuel discharge. In this case, the inner fuel passage 32h constitutes, together with the outer fuel passage 37, a fuel discharge passage 21e for discharging the fuel located inside the pressure regulating chamber 23 to the outside of the housing 21.

Figure 6A:
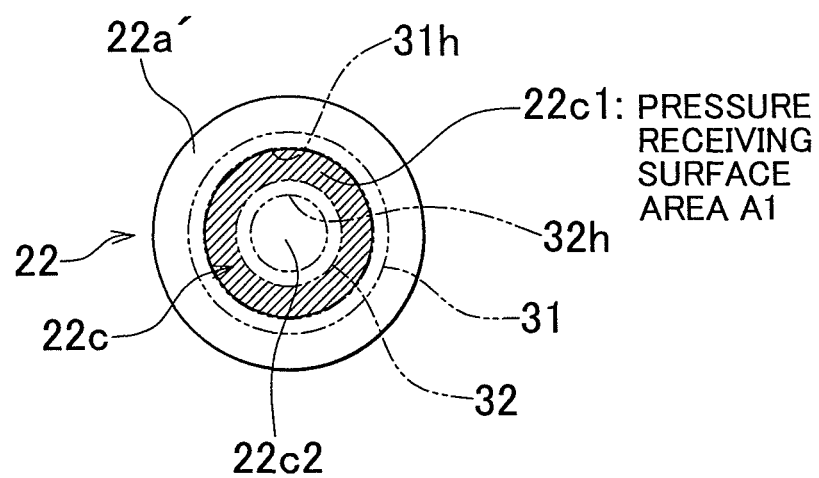
FIGS. 6A and 6B are explanatory drawings illustrating the arrangement of the pressure receiving region of the pressure regulating member in the pressure regulating device according to the second embodiment of the invention.
Figure 6B:
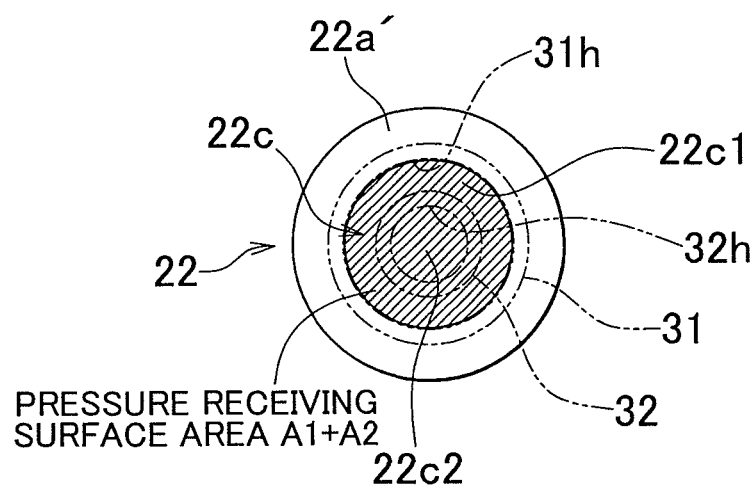

As shown in FIG. 6A, the pressure regulating member 22 has the passage closing surface portion 22c. The passage closing surface portion 22c closes the inner end portions of the intermediate fuel passage 31h and the inner fuel passage 32h when the portion on the side of first surface, that is the valve surface of the plate member 25, sits on the outer annular valve seat portion 31 and the inner annular valve seat portion 32. On the other hand, The passage closing surface portion 22c opens the inner end portions of the intermediate fuel passage 31h and the inner fuel passage 32h to an opening degree corresponding to the displacement amount of the plate member 25 of the pressure regulating member 22 in the valve opening direction.

Further, the pressure regulating member 22 receives the impelling force in the valve opening direction (direction in which the intermediate fuel passage 31h is communicated with the fuel discharge passage 21e) based on the pressure of fuel introduced in the intermediate fuel passage 31h inside the housing 21 and the impelling force in the valve closing direction (direction in which the communication of the intermediate fuel passage 31h with the fuel discharge passage 21e is cut off) from the compression coil spring 27. The pressure regulating member 22 communicates the intermediate fuel passage 31h for the fuel introduction with the outer fuel passage 37 and the inner fuel passage 32h for the fuel discharge, that is, with the fuel discharge passage 21e, and cuts off the intermediate fuel passage and the fuel discharge passage from each other, according to the impelling force in the valve opening direction and the impelling force in the valve closing direction.

Further, the annular pressure receiving surface portion 22c1, which is part of the passage closing surface portion 22c of the pressure regulating member 22 and closes the intermediate fuel passage 31h, receives at all times the pressure of fuel introduced in the intermediate fuel passage 31h. The central round pressure receiving surface portion 22c2, which is part of the passage closing surface portion 22c of the pressure regulating member 22 and closes the inner fuel passage 32h, receives the pressure of fuel inside the inner fuel passage 32h when the cut-off valve 45 is in the OFF state (closed valve state). Since the outer fuel passage 37 is opened inside the fuel tank 2 at all times, an annular surface 22a' corresponding to the pressure receiving surface portion 22a according to the first embodiment receives the pressure corresponding to the internal pressure (for example, atmospheric pressure) of the fuel tank 2 and is substantially not pressurized.

The normally closed cut-off valve 45 provided on the downstream of the inner fuel passage 32h (or somewhere in the inner fuel passage 32h) serves as a discharge restricting means for restricting the discharge of fuel from the inner fuel passage 32h into the fuel tank 2. When the cut-off valve 45 is closed, the cut-off valve 45 closes the internal passage thereof, on the downstream of the inner fuel passage 32h which is at least one of the plurality of discharge passage portions of the fuel discharge passage 21e. When the valve is open, the passage on the downstream of the inner fuel passage 32h is open inside the fuel tank 2. The opening and closing of the cut-off valve 45 is controlled by control signals from the ECU 41.

The cut-off valve 45 has the first port 45a connected to the inner fuel passage 32h via the communication hole 21c for the fuel discharge, the second port 45b opened inside the fuel tank 2, and the electromagnetic operation portion 45c that switchingly operates the communication state between these first and second ports 45a, 45b. This configuration is similar to that of the above-described first embodiment in that, depending on whether or not the electromagnetic operation portion 45c is in the ON state, the second port 45b is communicated with the first port 45a in the ON state and the second port 45b is cut off from the first port 45a in the OFF state.

Where the cut-off valve 45 closes the passage on the downstream of the inner fuel passage 32h, the discharge of fuel from the inner fuel passage 32h and the outer fuel passage 37, which are the plurality of discharge passage portions of the fuel discharge passage 21e, is selectively restricted by only the outer fuel passage 37. As a result, the fuel inside the inner fuel passage 32h is pressurized by the fuel discharged from the intermediate fuel passage 31h. Thus, when the passage on the downstream of the inner fuel passage 32h is closed by the cut-off valve 45, the central round pressure receiving surface portion 22c2 of the passage closing surface portion 22c of the pressure regulating member 22 that corresponds to the inner fuel passage 32h receives the pressure of fuel pressurized inside the inner fuel passage 32h. At this time, a state is assumed in which the substantial pressure receiving surface area of the pressure regulating member 22 is not merely the pressure receiving surface area A1 of the annular pressure receiving surface portion 22c1 corresponding to the intermediate fuel passage 31h, but is increased by the pressure receiving surface area A2 to the central round pressure receiving surface portion 22c2 corresponding to the inner fuel passage 32h (see the hatched pressure receiving surface area A1+A2 in FIG. 6B).

Further, the pressure receiving surface area at the surface opposite the surface of the pressure regulating member 22 that is impelled in the all-time closed-valve direction by the compression coil spring 27 is switched between the pressure receiving surface area A1 in the open state of the cut-off valve 45 and the pressure receiving surface area A1+A2 in the closed state of the cut-off valve 45. As a result, the pressure of fuel inside the intermediate fuel passage 31h that is back-pressure pressurized by the compression coil spring 27 via the pressure regulating member 22 is set such that the fuel pressure in the closed state of the cut-off valve 45 is lower than the fuel pressure in the open state of the cut-off valve by a ratio A1/(A1+A2). Thus, where the set pressure on the low pressure side (the low set pressure) of the pressure regulator 20 is denoted by L and the set pressure on the high pressure side (the high set pressure) is denoted by H, the ratio L/H of the set pressures is set to the pressure receiving surface area ratio A1/(A1+A2), which is a variable ratio of pressure receiving surface areas in the open and closed states of the cut-off valve 45.

Thus, in the embodiment, the fuel discharge passage 21e for discharging the fuel located inside the housing 21 to the outside includes the outer fuel passage 37 and the inner fuel passage 32h serving as a plurality of discharge passage portions configured to pass the fuel introduced in the intermediate fuel passage 31h. Further, the cut-off valve 45 (discharge restricting means, opening-closing valve) that restricts the discharge of fuel from at least one discharge passage portion, for example, the inner fuel passage 32h, is provided on the downstream of the two fuel passages 37, 32h (may be in some intermediate portion of the two fuel passages 37, 32h). The cut-off valve 45 changes, on the downstream the inner fuel passage 32h, the internal cross-sectional area thereof from a maximum in the open valve state to a minimum in the closed valve state, thereby changing the cross-sectional areas of the two fuel passages 32h, 37 relative to each other. As a result, the discharge of fuel from the two fuel passages 37, 32h is selectively restricted only to the outer fuel passage 37.

In the embodiment, the pressure regulating member 22 that receives the impelling force in the all-time cut-off direction from the compression coil spring 27 changes the communication state of the intermediate fuel passage 31h for the fuel introduction with the inner fuel passage 32h and the outer fuel passage 37 for the fuel discharge according to the pressure of fuel introduced into the pressure regulating chamber 23. Further, depending on whether or not the discharge of fuel from the inner fuel passage 32h is restricted by the cut-off valve 45, the pressure of fuel introduced in the intermediate fuel passage 31h is adjusted to a different set pressure. Thus, switching of the set pressure of the pressure regulator 20 can be performed by restricting with the cut-off valve 45 the discharge of fuel from the inner fuel passage 32h, from among the outer fuel passage 37 and the inner fuel passage 32h. Therefore, the pressure of fuel introduced into the intermediate fuel passage 31h can be switched to a high pressure and a low pressure only on one surface of the pressure regulating member 22, without introducing the fuel to both surface sides of the pressure regulating member 22 and the number of pipes and seal locations of the pressure regulator 20 can be decreased. As a result, similarly to the above-described first embodiment, it is possible to provide a compact low-cost pressure regulating device with a simple pipe configuration that is suitable for set pressure switching.

Figure 7:
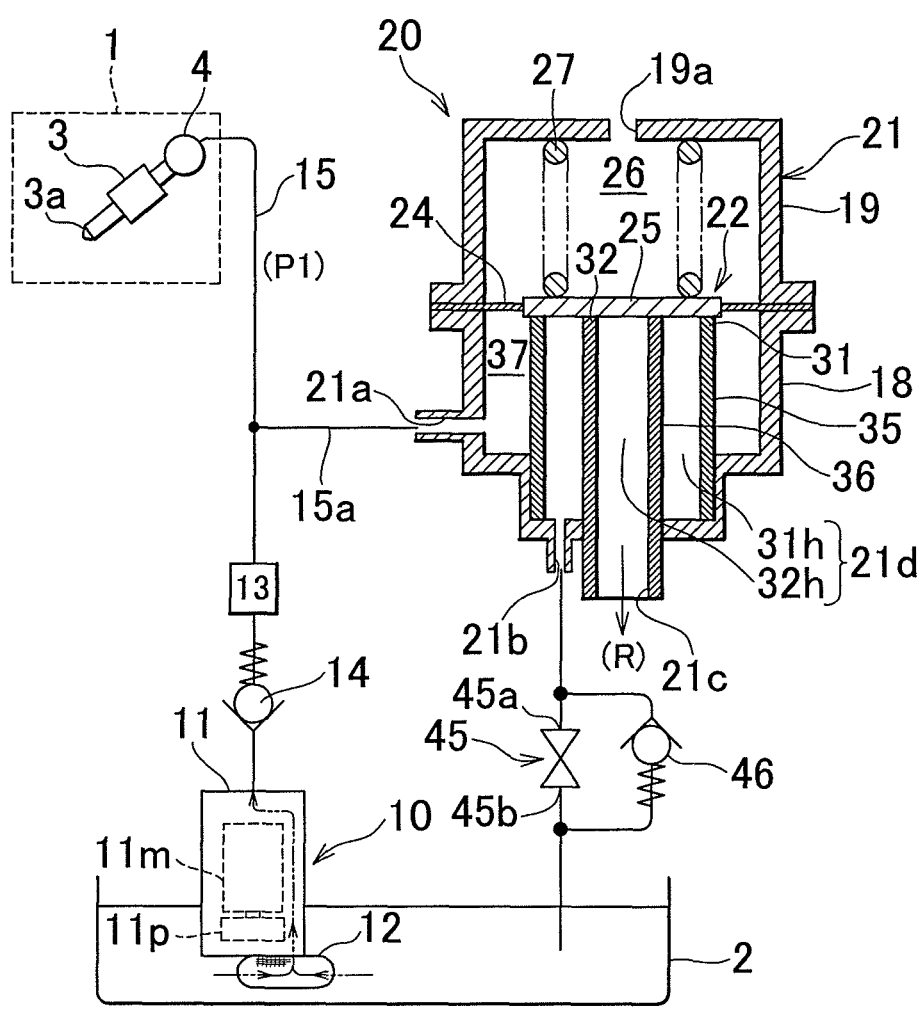
FIG. 7 is a schematic configuration diagram of a principal portion of the pressure regulating device according to the third embodiment of the invention.

(Third Embodiment) FIG. 7 illustrates a pressure regulating device according to the third embodiment of the invention.

As shown in the figure, in the embodiment, a relief valve disposed in parallel with the cut-off valve 45 is provided in addition to the configuration identical to that of the above-described first embodiment. Accordingly, the constituent elements identical to those of the above-described first embodiment will be assigned with reference numerals identical to those of the corresponding constituent elements shown in FIGS. 1 to 4.

As shown in FIG. 7, a discharge restricting means is constituted by the cut-off valve 45 and a relief valve 46. The cut-off valve 45 is an opening-closing valve disposed on the downstream of the intermediate flow passage 31h that is the discharge passage portion in which the discharge of fuel is restricted. The relief valve 46 is provided in parallel with the cut-off valve 45 and open when the pressure of fuel inside the intermediate flow passage 31h reaches a preset pressure.

The effect obtained in the embodiment is similar to that obtained in the first embodiment.

Further, in the embodiment, the increase in pressure of fuel in the intermediate flow passage 31h is restricted by the cut-off valve 45 and the relief valve 46, and therefore the fuel pressure inside the intermediate flow passage 31h is prevented from being too high. Furthermore, the pressure of fuel received by the pressure regulating member 22 in the intermediate flow passage 31h can be regulated by the set pressure of the relief valve 46.

Figure 8:
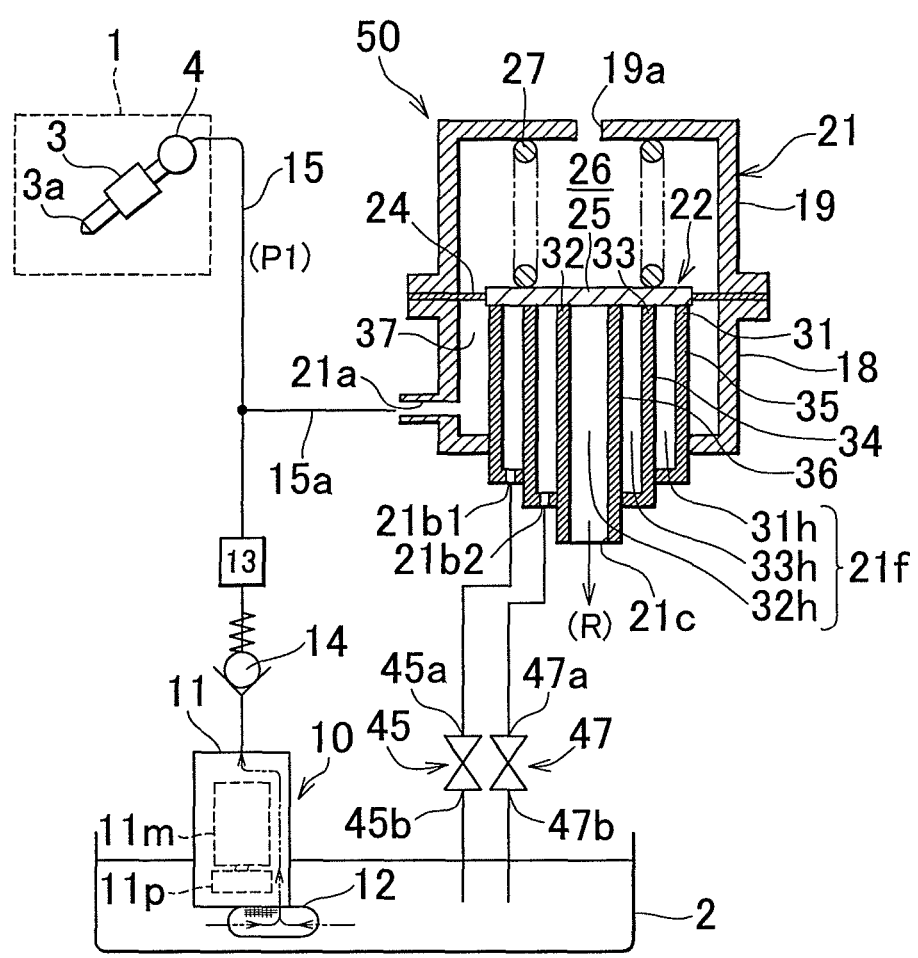
FIG. 8 is a schematic configuration diagram of a principal portion of the pressure regulating device according to the fourth embodiment of the invention.

(Fourth Embodiment) FIG. 8 illustrates a pressure regulating device according to the fourth embodiment of the invention.

As shown in the FIG. 8, in the embodiment, three concentrically stacked valve seats are disposed inside the pressure regulating chamber. The configuration other than that of the interior of the pressure regulating chamber and discharge restricting means is similar to that of the above-described first embodiment. Accordingly, the constituent elements identical to those of the above-described first embodiment will be assigned with reference numerals identical to those of the corresponding constituent elements shown in FIGS. 1 to 4.

As shown in FIG. 8, in the pressure regulating device of the embodiment, the housing 21 has the communication hole 21a for the fuel introduction that is connected to a branched passage 15a of the fuel passage 15 and serves to introduce the fuel and a plurality of communication holes 21b1, 21b2, 21c for the fuel discharge through which the fuel is discharged from inside the pressure regulating chamber 23. Further, an outer annular valve seat portion 31, an inner annular valve seat portion 32, and an intermediate annular valve seat portion 33 disposed between the outer and inner annular valve seat portions 31, 32 are disposed substantially concentrically in the housing 21. The annular valve seat portions 31 to 33 and the plate member 25 constitute a pressure regulating valve mechanism that is opened and closed by relative displacement of the components thereof. The outer annular valve seat portion 31, inner annular valve seat portion 32, and intermediate annular valve seat portion 33 are a plurality of annular valve seat members facing the plate member 25 of the pressure regulating member 22 inside the pressure regulating chamber 23.

More specifically, the annular valve seat portions 31 to 33 are constituted by an outer tubular member 35, an inner tubular member 36, and an intermediate tubular member 34 that have mutually different diameters and disposed concentrically inside the housing 21.

In this configuration, the annular outer fuel passage 37 communicating with the communication hole 21a for the fuel discharge between the housing 21 and the pressure regulating member 22 is formed on the outer circumferential side of the outer tubular member 35 corresponding to the outer annular valve seat portion 31. The round columnar inner fuel passage 32h (discharge passage portion) communicating with the central communication hole 21c for the fuel discharge is formed on the inner circumferential side of the inner tubular member 36 corresponding to the inner annular valve seat portion 32. The inner fuel passage 32h is open at all times inside the fuel tank 2 via the central communication hole 21c.

Further, a tubular intermediate fuel passage 33h (discharge passage portion) communicating with the communication hole 21b2 for the fuel discharge is formed between the inner tubular member 36 and the intermediate tubular member 34 located on the outer side thereof. The tubular intermediate fuel passage 31h (discharge passage portion) communicating with the communication hole 21b1 for the fuel discharge is formed between the intermediate tubular member 34 and the outer tubular member 35 located on the outer side thereof.

The inner fuel passage 32h and the plurality (inner and outer) of intermediate fuel passages 31h, 33h constitute as a whole a fuel discharge passage 21f through which the fuel located inside the pressure regulating chamber 23 is discharged to the outside of the housing 21.

One intermediate fuel passage 31h is connected to the first port 45a of the cut-off valve 45 via the communication hole 21b1 for the fuel discharge. The fuel located inside this passage is discharged into the fuel tank 2 outside the housing 21 when the cut-off valve 45 is open. The other intermediate fuel passage 33h is connected to a first port 47a of a cut-off valve 47 via the communication hole 21b2 for the fuel discharge. The fuel located inside this passage is discharged into the fuel tank 2 outside the housing 21 when the cut-off valve 47 is open.

The cut-off valves 45, 47 are constituted, for example, to be similar to one another. The cut-off valves 45, 47 have the first ports 45a, 47a connected to the intermediate fuel passages 31h, 33h via the corresponding communication holes 21b1, 21b2 for the fuel discharge, second ports 45b, 47b open inside the fuel tank 2, and electromagnetic operation portions 45c, 47c that switchingly operate the communication state between these first ports 45a, 47a and the second ports 45b, 47b. Further, depending on whether or not the ON state of the operation signal is assumed, the electromagnetic operation portions 45c, 47c communicate the second ports 45b, 47b with the first ports 45a, 47a in the ON state of the operation signal and cut off the second ports 45b, 47b from the first ports 45a, 47a in the OFF state of the operation signal. Where the operation signal is in the ON state, the energizing drive current is supplied from the ECU 41 side to the electromagnetic operation portions 45c, 47c. Where the operation signal is in the OFF state, the energizing drive current is not supplied from the ECU 41 side to the electromagnetic operation portions 45c, 47c. Therefore, the first ports 45a, 47a and the second ports 45b, 47b of the cut-off valves 45, 47 correspond to the inlet ports and outlet ports of two opening-closing valves that are opened and closed on the downstream of the intermediate fuel passages 31h, 33h.

The cut-off valves 45, 47 change the internal cross-sectional area thereof on the downstream of the intermediate fuel passages 31h, 33h (may be in some intermediate portion of the two fuel passages 31h, 33h) from a maximum in the open valve state to a minimum in the closed valve state. As a result, the discharge of fuel from the inner fuel passage 32h and the intermediate fuel passages 31h, 33h, which are a plurality of discharge passage portions of the fuel discharge passage 21f, is selectively restricted to a state in which the fuel is discharged from the passages other than the intermediate fuel passage 31h, a state in which the fuel is discharged from the passages other than the intermediate fuel passage 33h, and a state in which the fuel is discharged only through the inner fuel passage 32h.

In the embodiment, switching of the set pressure of the pressure regulator 20 can be also performed by restricting with the cut-off valves 45, 47, which are the discharge restricting means, the discharge of fuel from at least one of the intermediate fuel passages 31h, 33h and the inner fuel passage 32h, for example, from the intermediate fuel passages 31h, 33h. Therefore, similarly to the first embodiment, it is not necessary to introduce the fluid to both surface sides of the pressure regulating member 22 and the number of pipes and seal locations can be decreased. As a result, it is possible to provide a compact low-cost pressure regulating device with a simple pipe configuration that is suitable for set pressure switching.

Furthermore, in the embodiment, the pressure receiving surface area of the pressure regulating member 22 is respectively changed when the discharge of fuel is restricted from either of the intermediate fuel passages 31h, 33h, when the discharge of fuel is restricted from other of the two intermediate fuel passages 31h, 33h, and when the discharge of fuel is restricted from both intermediate fuel passages 31h, 33h. Therefore, the set pressure (pressure regulation value) of the pressure regulator 20 can be switched in multiple levels.

In each of the above-described embodiments, the fuel introduction passage is not set to the inner fuel passage 32h, but any fluid passage from among the plurality of fuel passages inside the fuel chamber 23 may be set as the fuel introduction passage. Further, in each of the above-described embodiments, only one fuel introduction passage is used, but two or more fuel introduction passages may be provided. A variable throttle element such as a valve forming a throttle passage when closed may be used instead of the cut-off valve 45 and the like as the discharge restricting means, and any valve that can change the opening degree thereof in response to a command signal may be also used.

In the above-described first embodiment, the pressure regulating member 22 is configured to have the flexible annular membrane member 24 and the plate member 25, but the annular membrane member 24 may be in the form of a piston that is held slidably inside the housing 21 and may support the rear surface of the plate member 25.

Further, in the above-described embodiments, the in-tank fuel supply system is considered, but the pressure regulator may be also disposed in the vicinity of the delivery pipe. Further, the outer tubular member 35, inner tubular member 36, and intermediate tubular member 34 are fabricated separately from the housing 21 and fixed to the housing 21, but it goes without saying that the outer tubular member 35 and the inner tubular member 36 may be formed integrally with the housing 21.

In addition, in the above-described first embodiment, the fuel consuming unit is a gasoline engine for a vehicle that consumes gasoline, but the invention may be also applied to engines using other fuels. Further, the invention may be also used in the case in which high/low pressure switching of fuel pressure is performed in various fuel consuming units that consume fuels to output any power.

As described hereinabove, in accordance with the invention, the switching of set pressure can be performed by restricting, with a discharge restricting means, the discharge of fuel from at least one of a plurality of discharge passage portions. Therefore, it is not necessary to introduce the fuel to both surface sides of the pressure regulating member and the number of pipes and seal locations can be reduced. The resultant effect is that a compact low-cost pressure regulating device with a simple pipe configuration that is suitable for set pressure switching can be provided. The invention may be used in all of the pressure regulating devices that regulate the fuel pressure when the fuel is supplied from the fuel consuming unit.

What is claimed is:
1. A pressure regulating device that regulates a pressure of a fuel, comprising
a housing that includes a fuel introduction passage into which the fuel to be supplied into a fuel consuming unit is introduced and a fuel discharge passage from which the fuel is discharged, wherein the fuel discharge passage includes a plurality of discharge passage portions each configured to pass therethrough the fuel introduced into the fuel introduction passage;

a pressure regulating member, provided so as to partition the housing, that communicates the fuel introduction passage and the fuel discharge passage with each other and cuts off the fuel introduction passage and the fuel discharge passage from each other, according to a pressure of the fuel introduced into the housing;

an impelling mechanism that impels the pressure regulating member in a direction of cutting off the fuel introduction passage and the fuel discharge passage from each other; and a discharge restricting mechanism, provided in the fuel discharge passage, that selectively restricts discharge of the fuel from the plurality of discharge passage portions, wherein the pressure regulating member faces the plurality of the fuel discharge passage portions, wherein the fuel introduction passage and the plurality of discharge passage portions are compartmentalized by a plurality of annular valve seat members provided in the housing; and the discharge passage portion that is subjected to the fuel discharge restriction by the discharge restricting mechanism is disposed to be adjacent to the fuel introduction passage.

2. The pressure regulating device according to claim 1, wherein
the discharge restricting mechanism restricts discharge of the fuel from at least one discharge passage portion from among the plurality of discharge passage portions by changing a passage cross sectional area of the at least one discharge passage portion.

3. The pressure regulating device according to claim 2, wherein
the discharge restricting mechanism is constituted by an opening-closing valve disposed in the at least one discharge passage portion.

4. The pressure regulating device according to claim 2, wherein
the discharge restricting mechanism is constituted by an opening-closing valve disposed in the at least one discharge passage portion and a relief valve provided in parallel with the opening-closing valve.

5. The pressure regulating device according to claim 1, wherein
the pressure regulating member includes a first surface that forms, between the housing and the first surface, a pressure regulating chamber communicating with the fuel introduction passage and a second surface that positions on an opposite side to the first surface;
the impelling mechanism impels the second surface in the direction of cutting off the fuel introduction passage and the fuel discharge passage from each other; and
the pressure regulating member shifts in the direction of communicating the fuel introduction passage and the fuel discharge passage with each other, according to a pressure of the fuel introduced in the pressure regulating chamber.

6. The pressure regulating device according to claim 1, wherein
the plurality of annular valve seat members are constituted by large-diameter and small-diameter tubular members provided coaxially with each other in the housing.

7. A pressure regulating device that regulates a pressure of a fuel, comprising:
a housing that includes a fuel introduction passage into which the fuel to be supplied into a fuel consuming unit is introduced and a fuel discharge passage from which the fuel is discharged, wherein the fuel discharge passage includes a plurality of discharge passage portions each configured to pass therethrough the fuel introduced into the fuel introduction passage;

a pressure regulating member, provided so as to partition the housing, that communicates the fuel introduction passage and the fuel discharge passage with each other and cuts off the fuel introduction passage and the fuel discharge passage from each other, according to a pressure of the fuel introduced into the housing;

an impelling mechanism that impels the pressure regulating member in a direction of cutting off the fuel introduction passage and the fuel discharge passage from each other; and a discharge restricting mechanism, provided in the fuel discharge passage, that selectively restricts discharge of the fuel from the plurality of discharge passage portions, wherein the pressure regulating member faces the plurality of the fuel discharge passage portions, wherein
the pressure regulating member is constituted by an annular membrane member and a plate member positioned on an inner circumference of the annular membrane member; and
the impelling mechanism impels the plate member in the direction of cutting off the fuel introduction passage and the fuel discharge passage from each other,
wherein
the fuel introduction passage and the plurality of discharge passage portions are compartmentalized by a plurality of annular valve seat members provided in the housing; and
the pressure regulating member cuts off the fuel introduction passage and the fuel discharge passage from each other when the plate member sits on the plurality of annular valve seat portions.

8. The pressure regulating device according to claim 7, wherein
when a fuel pump that supplies the pressurized fuel to the fuel consuming unit is to be stopped, the discharge restricting mechanism cancels the restriction prior to the stop.

* * * * *